US012626183B2

(12) United States Patent
Cmielowski et al.

(10) Patent No.: US 12,626,183 B2
(45) Date of Patent: May 12, 2026

(54) TRAINING MACHINE LEARNING MODELS

(71) Applicant: INTERNATIONAL BUSINESS MACHINES CORPORATION, Armonk, NY (US)

(72) Inventors: Lukasz G. Cmielowski, Cracow (PL); Szymon Kucharczyk, Cracow (PL); Kiran A. Kate, Chappaqua, NY (US); Daniel Jakub Ryszka, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 1158 days.

(21) Appl. No.: 17/346,760

(22) Filed: Jun. 14, 2021

(65) Prior Publication Data

US 2022/0398489 A1    Dec. 15, 2022

(51) Int. Cl.
*G06N 20/00* (2019.01)
*G06F 18/2113* (2023.01)
*G06V 30/40* (2022.01)

(52) U.S. Cl.
CPC ......... *G06N 20/00* (2019.01); *G06F 18/2113* (2023.01); *G06V 30/40* (2022.01)

(58) Field of Classification Search
CPC ...... G06N 20/00; G06F 18/2113; G06V 30/40
See application file for complete search history.

(56) References Cited

U.S. PATENT DOCUMENTS

2017/0193401 A1*  7/2017  Grehant ................. G06F 16/22
2019/0228343 A1   7/2019  Gu 2020/0302234 A1   9/2020  Walters
2020/0327379 A1* 10/2020  Dong ..................... G06N 3/084
2020/0334569 A1  10/2020  Moghadam
2021/0065048 A1   3/2021  Salonidis
(Continued)

FOREIGN PATENT DOCUMENTS

CN        117355849 A       1/2024
EP          4356312 A1      4/2024
(Continued)

OTHER PUBLICATIONS

Zhou, Lina, et al. "Machine learning on big data: Opportunities and challenges." Neurocomputing 237 (2017): 350-361. https://www.sciencedirect.com/science/article/pii/S0925231217300577 (Year: 2017).*

(Continued)

*Primary Examiner* — Michael H Hoang
(74) *Attorney, Agent, or Firm* — Elliot J. Shine

(57) ABSTRACT

A method, a computer system and a computer program product for training machine learning models. The present invention may include coupling the machine learning system to a network and receiving a new estimator not included in the list of estimators and a respective documentation. The present invention may include adding the new estimator to the list stored in memory. The present invention may include reading the documentation and providing the machine learning process tool with respective extracted data. The present invention may include adapting, at least one training data set. The present invention may include training at least a subset of the machine learning models by using the new estimator.

17 Claims, 4 Drawing Sheets

(56) References Cited

U.S. PATENT DOCUMENTS

2023/0336340 A1* 10/2023 Polleri ............... G06F 11/3466

FOREIGN PATENT DOCUMENTS

JP      2024-522708  A      6/2024
WO    2022/263220  A1    12/2022

OTHER PUBLICATIONS

Buitinck, Lars, et al. "API design for machine learning software: experiences from the scikit-learn project." arXiv preprint arXiv:1309. 0238 (2013). (Year: 2013).*

Smith, Nicholas. "The Shooting Regressor; Randomized Gradient-Based Ensembles." arXiv preprint arXiv:2009.06172 (2020). https://arxiv.org/pdf/2009.06172 (Year: 2020).*

Smith, Micah J., et al. "The machine learning bazaar: Harnessing the ml ecosystem for effective system development." Proceedings of the 2020 ACM SIGMOD International Conference on Management of Data. 2020. https://dl.acm.org/doi/pdf/10.1145/3318464. 3386146 (Year: 2020).*

Pezoa, Felipe, et al. "Foundations of JSON schema." Proceedings of the 25th international conference on World Wide Web. 2016. https://dl.acm.org/doi/pdf/10.1145/2872427.2883029 (Year: 2016).*

Raschka, Sebastian. "Model evaluation, model selection, and algorithm selection in machine learning." arXiv preprint arXiv:1811. 12808 (2018). https://arxiv.org/pdf/1811.12808 (Year: 2018).*

Shang, Zeyuan, et al. "Democratizing data science through interactive curation of ml pipelines." Proceedings of the 2019 international conference on management of data. 2019. https://dl.acm.org/doi/pdf/10.1145/3299869.3319863 (Year: 2019).*

International Searching Authority, "Notification of Transmittal of the International Search Report and the Written Opinion of the International Searching Authority, or the Declaration", International application No. PCT/EP2022/065328, International Filing Date Jun. 7, 2022, Mailed on Oct. 26, 2022, 15 pages.

Baudart et al., "Mining Documentation to Extract Hyperparameter Schemas," 7th ICML Workshop on Automated Machine Learning (2020), IBM Research, Retrieved from the Internet: https://www.automl.org/wp-content/uploads/2020/07/AutoML_2020_paper_15. pdf, 14 pages.

Disclosed Anonymously, "Ranking and Automatic Selection of Machine Learning Models," IP.com, IP.com No. IPCOM000252275D, IP.com Publication Date: Jan. 3, 2018, 34 pages.

Mell et al., "The NIST Definition of Cloud Computing", National Institute of Standards and Technology, Special Publication 800-145, Sep. 2011, 7 pages.

Soumendra, "Choosing an ML estimator," Medium, Blog, Mar. 30, 2019, https://soumendrak.medium.com/choosing-an-ml-estimators-d85eaf015039, 10 pages.

* cited by examiner

TRAINING MACHINE LEARNING MODELS

BACKGROUND

Embodiments of the present invention relate to the field of machine learning (ML) and specifically to training of machine learning models.

ML models are data files used by hardware and/or software entities or by hardware and/or software systems which run a dedicated software, with the purpose to produce a specific kind of output when an input having a predetermined format is provided. The ML models are defined as composed of different stages, the entirety of the stages being called a pipeline.

Two different ML models differ in the definition of at least one of these stages.

Of course, different ML models may use completely different learning methods, such as "Linear Regression", "Logic Regression", "Decision Tree", "Boosting", and the like.

Internal parameter values for the ML models need to be defined for being able to use the ML model for a specific task. This parameter defining is done via a training of the ML models where training data are used as inputs.

So-called estimators may represent a first stage of the ML models. An estimator is an algorithm that transforms the input training data into a single value or into multiple values for use by the subsequent stages in the ML model.

A method of training an ML model out of a group of different ML models each having another estimator enables a ranking, e.g., by using a ranking-score, and to select the ML model having the optimum rank, e.g., the highest ranking-score. That enables to use, after training with suitable training data, an ML model that is the optimum for a desired application or task.

With regard to a specific task, a user may preselect first the learning method applied by the ML model. Then, the estimator to be chosen is not arbitrary: Prior to a training, a user might apply predetermined criteria for a first selection of estimators that appear well-suited to the learning method chosen.

If, for instance, the target variable is discrete (categorical, nominal, ordinal), the methods "Logistic Regression", "Naive Bayes classifier", "Support Vector machines", "Decision trees", "Boosted trees", "Random forest", "Neural networks", and "K-Nearest neighbors", can be used. With a large number of input data "SGD", "Stochastic Gradient Descent"), might be helpful. "K-Nearest neighbors" is effective if training data is huge and noisy data.

If, to the contrary, the target variable is continuous, then a regression algorithm might need to be used, the regression algorithm selected out of the group comprising for example "Linear regression", "Polynomial regression", "Ridge Regression", "Lasso Regression", and "ElasticNet regression".

As to the estimators, for example, for an ML model using the learning method "Gaussian Naive Bayes", the estimator should output an average value $\mu$, a variance $\Box 2$, and the further statistical value P(Y). For the learning method "Logistic Regression", the estimator stage has to optimize an objective function using gradient descent. For "Decision Tree" and "Boosting with decision stamps" as learning methods, well-known algorithms are available on the marketplace. For the learning method "K-Nearest neighbors", the estimator must store all training data to classify new points. K is chosen using cross-variation. For the learning method "Support Vector Machines", a quadratic program has to be solved to find a boundary that maximizes a margin.

It might be that a user does not have an optimum estimator available on his or her system. However, many dedicated estimators are available in the marketplace from third parties, i.e. from suppliers that supply these estimators for specific other ML systems. Since different ML system may be as such incompatible, the respective estimators of a first system generally cannot be most simply used by a second system.

SUMMARY

Various embodiments provide a method for training machine learning (ML) models in an ML system by means of an ML process tool of the ML system, the ML process tool providing, when performing the training, at least one training data set out of a group of training data sets as an input to a respective estimator of an ML model, the estimator being selected out of a list of estimators stored in a memory of the ML, and the various embodiments provide a respective process system and computer program product, all of these as described by the subject matter of the independent claims. Advantageous embodiments are described in the dependent claims. Embodiments of the present invention can be freely combined with each other if they are not mutually exclusive.

In one embodiment, a method trains ML models in an ML system by means of an ML process tool of the ML system, the ML process tool providing, when performing the training, at least one training data set out of a group of training data sets as an input to a respective estimator of an ML model, the estimator being selected out of a list of estimators stored in a memory of the ML process system. The method includes coupling the ML system to a network. The method also includes receiving by the ML system via the network a new estimator not included in the list of estimators and a respective documentation. In addition, the method includes adding the new estimator to the list stored in the memory. The method further includes reading the documentation and providing the ML process tool with respective extracted data. The method also includes adapting by the ML process tool at least one training data set out of the group of training data sets to the new estimator on the basis of the extracted data. Lastly, the method includes training at least a subset of the ML models by using the new estimator, with the at least one training data set as an input, the training resulting in an output.

In another embodiment, a computer system for machine learning uses ML models and at least one training data set as an input to a respective estimator of an ML model, the estimator being selected out of a list of estimators, the computer system includes a memory storing the list of estimators and a group of training data sets, and an ML process tool configured for defining the group of ML models, the ML process tool being configured to provide, when performing the training, at least one training data set out of the group of training data sets as an input to a respective estimator of an ML model. The computer system is configured for coupling the computer system to a network. The computer system is also configured for receiving by the computer system via the network a new estimator not included in the list of estimators and a respective documentation. In addition, the computer system is configured for adding the new estimator to the list stored in the memory. The computer system is further configured for reading the documentation and providing the ML process tool with respective extracted data. The computer system is also configured for adapting by the ML process tool at least one training data set out of the group of training data sets to the new estimator on the basis of the extracted data. Lastly, the computer system is configured for training at least a subset of the ML models by using the new estimator, with the at least one training data set as an input, the training resulting in an output.

In another embodiment, a computer program product comprises a computer-readable storage medium having computer-readable program code embodied therewith, the computer-readable program code being configured to implement the method recited above.

BRIEF DESCRIPTION OF THE DRAWINGS

In the following, embodiments of the invention are explained in greater detail, by way of example only, making reference to the drawings in which.

DETAILED DESCRIPTION

Figure 1:
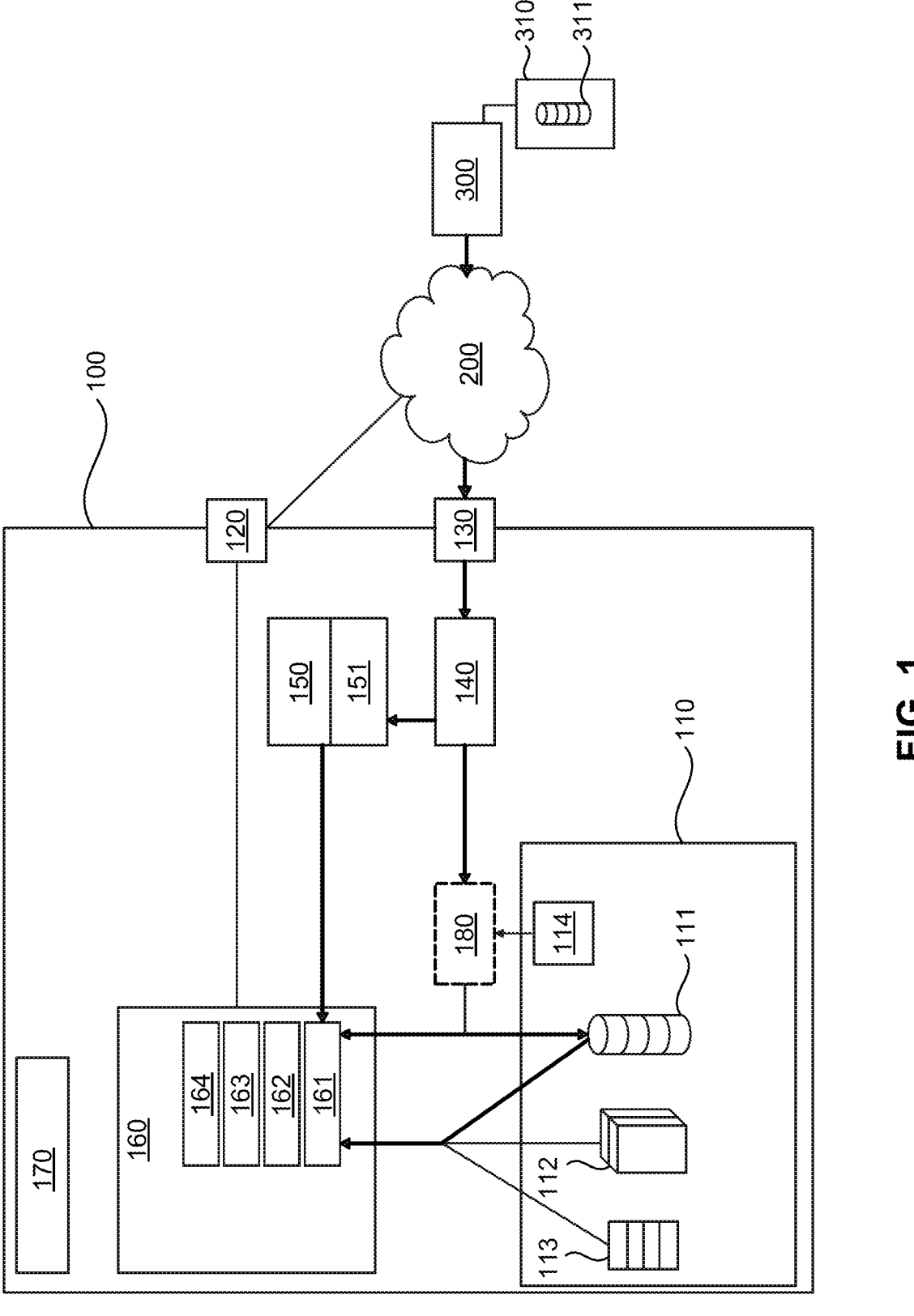
FIG. 1 illustrates an example of a system in accordance with an embodiment coupled via a network to another system.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may enhance the possibilities offered in ML environments. In particular, the present subject matter makes use of receiving of new estimators via a network and tailor-shaping the training data for these. Hence, a user might decide to gather an estimator from a supplier company that does not provide their estimator for the specific system the user utilizes. However, the user may be able to nevertheless make with much ease use of the new estimator. This may be done as a kind of "plug-in". This may improve accuracy in the final task to be performed by the ML system.

According to one embodiment, the method includes coupling the ML system via an Application Programming Interface (API), to the network. This may have the advantage that even if the formats used by the supplier company of the ML system and of another supplier company, the user might be able to nevertheless load (or receive) the new estimator from the latter, namely via the API.

According to one embodiment, the network is the Internet. This is available to nearly any user and thus facilitates obtaining of the new estimator.

According to one embodiment, the method further comprises ranking the ML models on the basis of the input and the output obtained in the training and selecting the ML model having the best rank. This enables to complete the overall training process prior to performing the task for which the training has been made. It may specifically be decided whether or not an ML model with the new estimator is selected.

According to one embodiment, the method further comprises defining rules to be fulfilled with respect to each estimator, including any new estimator that may be accepted, and the adapting at least one training data set is made in accordance with the rules. Hence, this provides for a unified treatment of the estimators, regardless of whether they are already listed or whether an estimator is new.

According to one embodiment thereof, the rules are been defined by at least one of a format of hyperparameters and one or more values of hyperparameters. Referring to hyperparameters is most easily at hand and thus allows for a quick integration (or ingestion) of new estimators. In an embodiment thereof, the hyperparameters may be defined by variable schemes, allowing for a high flexibility. For instance, the schemes might be updated if the software version used by the ML system as a whole is updated, if new software modules are included, or at least if a new estimator is received. This allows the user to be always up to date with the developments in the field, that including the supply of new estimators by third parties.

According to one embodiment, the method further comprises filtering out the new estimator if an adapting of at least one training data set in accordance with the rules is not possible or if the new estimator is not included in a list of allowed estimators, the list of allowed estimators being stored in the memory. Hence, there is a higher instance provided that might be able to control the loading of new estimators, e.g., from practically unknown sources.

According to one embodiment, the method further comprises converting of at least part of the documentation into a machine-readable format. Hence, the process is able to be performed in a fully automated manner. The machine-readable format may be JavaScript Object Notation®, JSON, which is rather common and thus easy to handle.

According to toe on embodiment, software is provided as a service in a cloud environment in order to provide for performing of at least one step of the method.

FIG. 1 illustrates an example of system 100 in accordance with an example of the present disclosure coupled to a second system 300 via the Internet 200.

The system 100 may comprise a memory 110, wherein estimators 111 may be stored, wherein ML models 112 may be stored, and wherein training data 113 may be stored. Moreover, optionally, the memory may store a list 114 of allowed estimators, these including the estimators 11 and possibly receivable new estimators.

The second system 300 may as well comprise a memory 310 wherein estimators 311 may be stored.

The system 100 may include an Input/Output-Unit I/O 120 for a user who may be able to control the processes performed by the system 100. The user may be able to run a machine learning system wherein he or she uses an estimator available in system 100. However, the estimator might prove not to be the optimum one, and specifically, with progress in time, might become outdated. For instance, the estimator may use a method that has been, in the field, widely replaced by another, more progressive method. If the system 100 is not automatically updated by its supplier, the user may desire to use a modern estimator supplied by another provider. Here, there arises a need to be able to download estimators from, e.g., system 300.

The user may thus likewise be able to detect information on the estimators 311 stored in memory 310 in the Internet, and to ask for being able to load one or more of these down to system 100. This may include the use of a common Internet browser. For instance, the system 300 might be accessible in the World Wide Web via the Internet browser at an Internet address of the system 300. There might be keywords that are indicated and stored at (or with regard to) the Internet address. From the keywords, the user may deduce that an estimator might be provided with and from the Internet address of the system 300. The keywords may be known to (i.e., stored in) an Internet search machine. Then, the user may open in his or her browser a mask of the Internet search machine and input these keywords or similar words into a search field of the mask. For instance, an estimator that uses linear regression might be able to be found by using the terms "estimator" and "regression", if these correspond to keywords the Internet search machine knows to be linked to the Internet address of the system 300. Other keyword pairs might lead to finding estimators elsewhere than at system 300.

The system 100 may include an Application Programming Interface, API, 130 and may be coupled via same to the Internet 200.

The system 100 may include a receiving module 140 that receives a new estimator from the API 130, i.e., from the Internet. The receiving module 140 may send the new estimator to be stored in the memory 110 at 111. A step of filtering 180 is optional and may include checking whether or not the new estimator is included in list 114 of allowed estimators.

The receiving module 140 may send documentation (i.e., a text file) that is received together with the new estimator to a further module, which may be a reading module 150. The reading module 150 may include a converting module that converts the documentation into a machine-readable format such as JavaScript Object Notation®, JSON. Such a procedure of converting is per se known from, and might thus be here performed as in, Guillaume Bardautand, Peter D. Kirchner, Martin Hirzel, Kiran Kate, "Mining Documentation to extract Hyperparameter Schemas", IBM Research, New York, USA, 7th ICML Workshop on Automated Machine Learning (2020). Hence, the reading module 150 may extract data of hyperparameter format (HPO). The reading module 150 may operate as a black box which performs the methods:

Get_defaults( )—get default hyperparameters
Get_params( )—get estimator parameters
Get_param_ranges( )—get estimator parameter ranges
Get_param_dist( )—get estimator parameters distribution
Get_op_Type( )—get operator type, e.g., classifier,
and further units or modules may perform:

Set_params—set estimator parameters
Fit( )
Score( )
Predict( )
and parameters may be:

N_jobs—number of threads to use for estimator fil
Random_state—random seed.

The system 100 may include an ML process tool 160 that is generally responsible for training. This tool may comprise an adapting module 161 that receives the estimators from memory 110 at 111 and the ML models stored at 112 and training data stored at 113. It thus may receive the new estimator and respective training data the system uses with its default or standard estimators. The adapting module 161 may serve to adapt training data to the requirements of the new estimator. To that end, it may receive from the reading module 150 the extracted data, namely hyperparameters and values as indicated above.

To give an example, the adapting module 161 may receive training data commonly used for another estimator that cover a real number range from [1, 30]. The adapting module may receive the information from Get_param_ranges( ) that the new estimator that has just been received requires a range from [1,15] and from Get_param_dist( ) that the values shall be integer. Hence, the adapting module 161 may divide the values of the original training data by two and may further discretize the range. Then, the adapted training data are suited for the new estimator.

The adapting module 161 may send the adapted training data and an ML model with the new estimator to a training module 162, where the training takes place.

The output of the training module each training time may be a score that may be sent to a ranking module 163 where all ML models are ranked according to their scores.

The ranking may enable the selecting in a selecting module 164.

The process may be made to comply with rules, such as may be defined within or by a rules-managing module 170.

Figure 2:
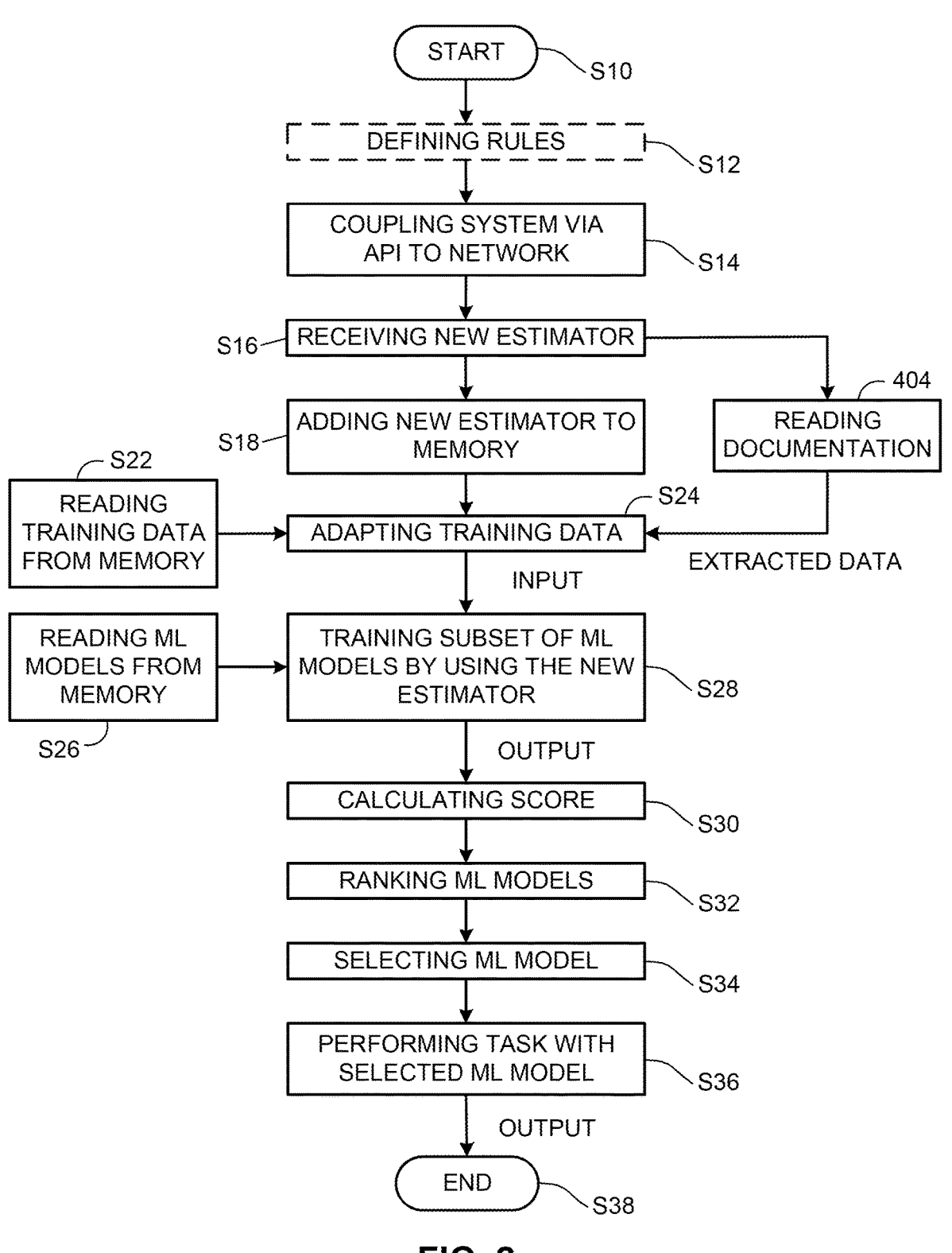
FIG. 2 illustrates an example of a flow diagram of a method in accordance with an embodiment.

FIG. 2 illustrates an example of a flow diagram of a method in accordance with the present subject matter.

The method may start at step S10.

Optionally, in step S12, rules may be defined, such as by rules management module 170, the rules to be fulfilled with respect to each estimator, including any new estimator that may be accepted.

In step S14, the system 100 may be coupled to system 300 via the API 130 and the Internet 200.

In step S16, a new estimator may be received, e.g., by receiving module 140.

In step S18, the new estimator may be added to the memory 110 at 111. This may depend on fulfilment of rules defined in step S12. In a parallel step S20, the documentation may be read as for instance by reading module 150.

In step S22, training data may be read from memory 110 at 113. Then, for example in adapting module 161 of the ML process tool 160, the training data may be received together with the new estimator and the extracted data, and the adapting step S24 may provide adapted training data as an input to, e.g., the training module 162.

In step S26, ML models may be read from memory 110 at 112, which may be followed by a step S28 of training subsets of ML models by using the new estimator and the input provided as a result of step S24. In step S30, a score may be calculated as a result of the training.

In step S32, a ranking may be provided, e.g., by the ranking module 163.

In step S34, an ML module might be selected, for instance on the basis of the ranking.

In step S36, the very task for which the user desired to test the new estimator may be performed with an ML module selected in step S34. Then, a final output may be obtained, and the method may terminate at step S38.

Embodiments of the present invention are capable of being implemented in conjunction with any type of computing environment now known or later developed, such as cloud computing.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
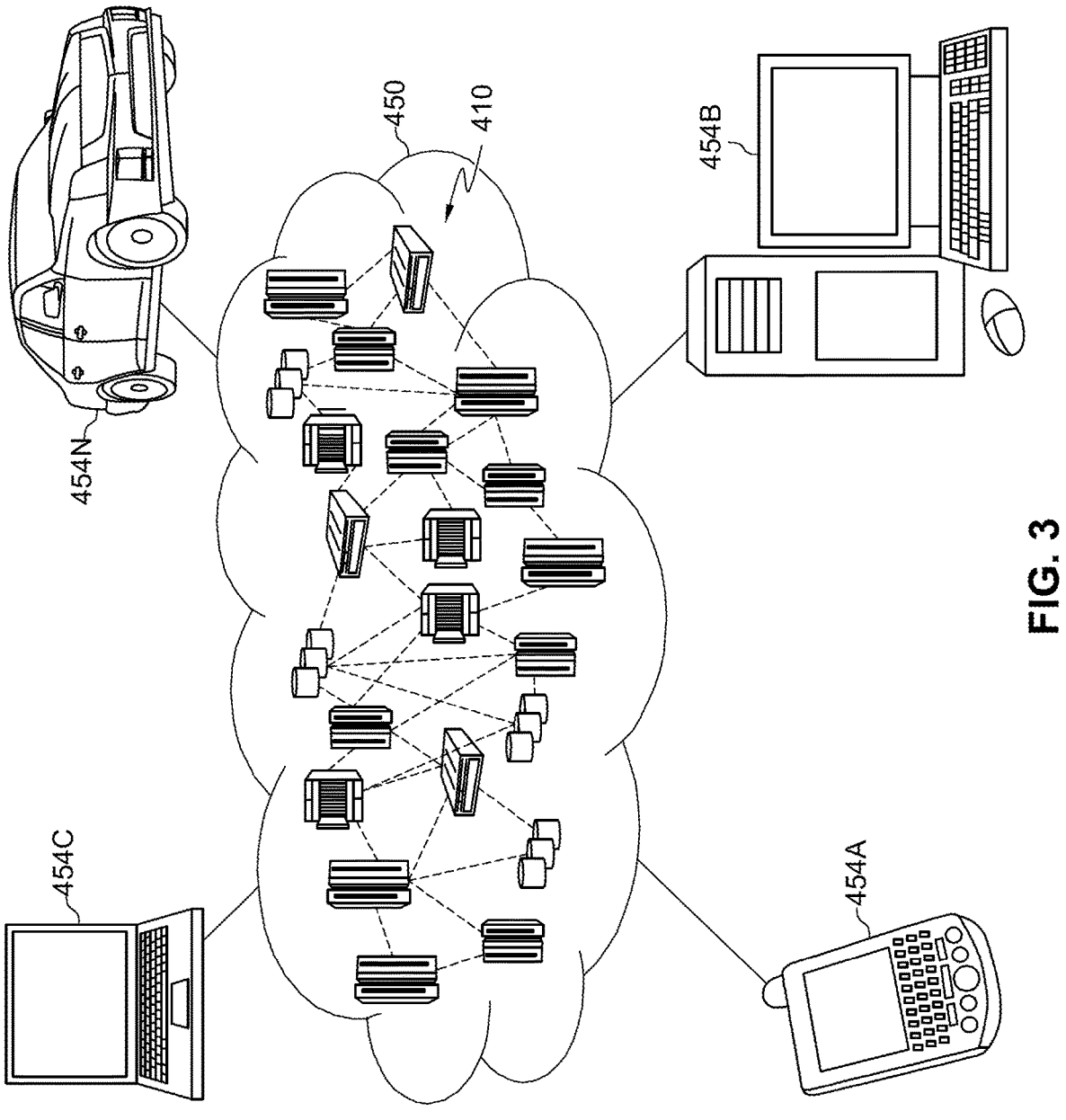
FIG. 3 depicts a cloud computing environment that may be used in an embodiment of the present invention.

Referring now to FIG. 3, illustrative cloud computing environment 450 is depicted. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 3 are intended to be illustrative only and that computing nodes 410 and cloud computing environment 450 can communicate with any type of computerized device over any type of network and/or network addressable connection (e.g., using a web browser).

Figure 4:
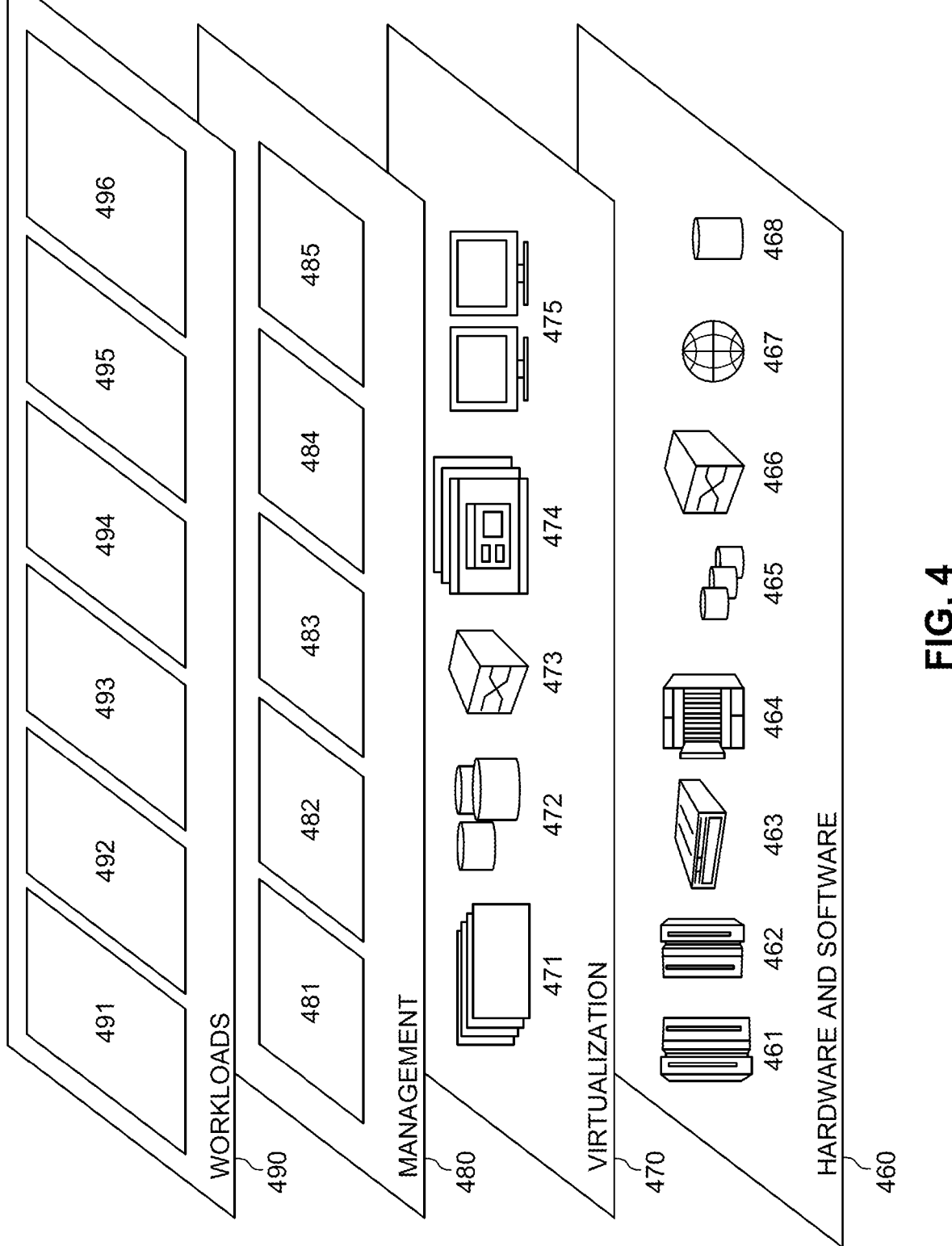
FIG. 4 depicts abstraction model layers that may be implemented with an embodiment of the present invention.

Referring now to FIG. 4, a set of functional abstraction layers provided by cloud computing environment 450 (FIG. 3) is shown. It should be understood in advance that the components, layers, and functions shown in FIG. 4 are intended to be illustrative only and embodiments of the invention are not limited to using cloud computing. As depicted, the following layers and corresponding functions are provided:

Hardware and software layer 460 include hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491; software development and lifecycle management 492; virtual classroom education delivery 493; data analytics processing 494; transaction processing 495; and training a subset of ML models by using the new estimator 496.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The memory referred to herein and/or the computer program product may be any tangible device that can retain and store data and store instructions for use by an instruction execution device. The memory or computer program product may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for training machine learning models in a machine learning system using a machine learning process tool of the machine learning system, the machine learning process tool providing, when performing the training, at least one training data set out of a group of training data sets as an input to a respective estimator of a machine learning model, the estimator being selected out of a list of estimators stored in a memory of the machine learning process system, the method comprising:

coupling, via an Application Programming Interface (API), the machine learning system to a network, wherein the machine learning system is comprised of a receiving module and a reading module;

receiving, by the machine learning system, via the network, a new estimator not included in the list of estimators and a respective documentation;

adding the new estimator to the list stored in the memory;

reading, by the reading module, the documentation and providing the machine learning process tool with respective extracted data, wherein the data is extracted from a machine-readable format of the documentation and is comprised of a plurality of hyperparameters and corresponding values;

adapting, by the machine learning process tool, at least one training data set out of the group of training data sets to the new estimator based on the extracted data by adapting one or more hyperparameters and values of the at least one training data set to include parameter ranges and parameter distributions with the corresponding values from the documentation of the new estimator;

training at least a subset of the machine learning models by using the new estimator, with the at least one training data set as an input, the training resulting in an output score from each of the machine learning models of the subset;

selecting a machine learning model from the machine learning models of the subset based on a ranking of the machine learning models of the subset according to the input and the output score obtained during the training; and generating a final output from the machine learning model using the new estimator in response to a task identified by a user.

2. The method of claim 1, further comprising:

defining rules to be fulfilled with respect to each estimator, including any new estimator that may be accepted, and the adapting at least one training data set being made in accordance with the rules; and filtering out the new estimator if an adapting of at least one training data set in accordance with the rules is not possible or if the new estimator is not included in a list of allowed estimators, the list of allowed estimators being stored in the memory.

3. The method of claim 2, wherein the rules are defined by at least one of a format of hyperparameters and one or more values of the hyperparameters, the hyperparameters being defined by variable schemes.

4. The method of claim 3, further comprising:

updating the schemes upon loading of at least one or more new estimators or inclusion of a new software module.

5. The method of claim 1, wherein the receiving module receives the new estimator from the API and sends the new estimator and the respective documentation to a reading module, and wherein the reading module includes a converting module.

6. The method of claim 5, further comprising:

converting, by the converting module of the reading module, at least part of the documentation of the new estimator into the machine-readable format, the machine-readable format being JavaScript Object Notation®, JSON.

7. The method of claim 1, wherein the extracted data is extracted from the documentation of the new estimator by the reading module, the reading module performing one or more methods, including at least one or more of, get default hyperparameters, get estimator parameters, get estimator parameter ranges, get estimator parameters distribution, get operator type.

8. A computer system for machine learning by using machine learning models and by using at least one training data set as an input to a respective estimator of a machine learning model, the estimator being selected out of a list of estimators, the computer system including:

a memory storing the list of estimators and a group of training data sets, and a machine learning process tool configured for defining the group of machine learning models, the machine learning process tool being configured to provide, when performing the training, at least one training data set out of the group of training data sets as an input to a respective estimator of the machine learning model;

the computer system being configured for:

coupling, via an Application Programming Interface (API), the machine learning system to a network, wherein the machine learning system is comprised of a receiving module and a reading module;

receiving, by the machine learning system, via the network, a new estimator not included in the list of estimators and a respective documentation;

adding the new estimator to the list stored in the memory;

reading, by the reading module, the documentation and providing the machine learning process tool with respective extracted data, wherein the data is extracted from a machine-readable format of the documentation and is comprised of a plurality of hyperparameters and corresponding values;

adapting, by the machine learning process tool, at least one training data set out of the group of training data sets to the new estimator based on the extracted data by adapting one or more hyperparameters and values of the at least one training data set to include parameter ranges and parameter distributions with the corresponding values from the documentation of the new estimator;

training at least a subset of the machine learning models by using the new estimator, with the at least one training data set as an input, the training resulting in an output score from each of the machine learning models of the subset;

selecting a machine learning model from the machine learning models of the subset based on a ranking of the machine learning models of the subset according to the input and the output score obtained during the training; and generating a final output from the machine learning model using the new estimator in response to a task identified by a user.

9. The computer system of claim 8, further comprising:

defining rules to be fulfilled with respect to each estimator, including any new estimator that may be accepted, and the adapting at least one training data set being made in accordance with the rules; and filtering out the new estimator if an adapting of at least one training data set in accordance with the rules is not possible or if the new estimator is not included in a list of allowed estimators, the list of allowed estimators being stored in the memory.

10. The computer system of claim 9, wherein the rules are defined by at least one of a format of hyperparameters and one or more values of the hyperparameters, the hyperparameters being defined by variable schemes.

11. The computer system of claim 10, further comprising:

updating the schemes upon loading of at least one or more new estimators or inclusion of a new software module.

12. The computer system of claim 11, wherein the receiving module receives the new estimator from the API and sends the new estimator and the respective documentation to a reading module, and wherein the reading module includes a converting module, and wherein the converting module converts at least part of the documentation of the new estimator into the machine-readable format, the machine-readable format being JavaScript Object Notation®, JSON.

13. A computer program product comprising:

a machine learning process tool of a machine learning system, the machine learning process tool providing, when performing a training, at least one training data set out of a group of training data sets as an input to a respective estimator of a machine learning model, the estimator being selected out of a list of estimators stored in a memory of the machine learning process system;

a computer-readable storage medium having computer-readable program code embodied therewith, the computer-readable program code being configured to implement a method comprising:

coupling, via an Application Programming Interface (API), the machine learning system to a network, wherein the machine learning system is comprised of a receiving module and a reading module;

receiving, by the machine learning system, via the network, a new estimator not included in the list of estimators and a respective documentation;

adding the new estimator to the list stored in the memory;

reading, by the reading module, the documentation and providing the machine learning process tool with respective extracted data, wherein the data is extracted from a machine-readable format of the documentation and is comprised of a plurality of hyperparameters and corresponding values;

adapting, by the machine learning process tool, at least one training data set out of the group of training data sets to the new estimator based on the extracted data by adapting one or more hyperparameters and values of the at least one training data set to include parameter ranges and parameter distributions with the corresponding values from the documentation of the new estimator;

training at least a subset of the machine learning models by using the new estimator, with the at least one training data set as an input, the training resulting in an output score from each of the machine learning models of the subset;

selecting a machine learning model from the machine learning models of the subset based on a ranking of the machine learning models of the subset according to the input and the output score obtained during the training; and generating a final output from the machine learning model using the new estimator in response to a task identified by a user.

14. The computer program product of claim 13, further comprising:

defining rules to be fulfilled with respect to each estimator, including any new estimator that may be accepted, and the adapting at least one training data set being made in accordance with the rules; and filtering out the new estimator if an adapting of at least one training data set in accordance with the rules is not possible or if the new estimator is not included in a list of allowed estimators, the list of allowed estimators being stored in the memory.

15. The computer program product of claim 14, wherein the rules are defined by at least one of a format of hyperparameters and one or more values of the hyperparameters, the hyperparameters being defined by variable schemes.

16. The computer program product of claim 15, further comprising:

updating the schemes upon loading of at least one or more new estimators or inclusion of a new software module.

17. The computer program product of claim 16, wherein the receiving module receives the new estimator from the API and sends the new estimator and the respective documentation to a reading module, and wherein the reading module includes a converting module, and wherein the converting module converts at least part of the documentation of the new estimator into the machine-readable format, the machine-readable format being JavaScript Object Notation®, JSON.

\* \* \* \* \*